United States Patent
Kramarenko

(10) Patent No.: US 10,429,165 B2
(45) Date of Patent: Oct. 1, 2019

(54) TARED CALIPER

(71) Applicant: Sergii Kramarenko, Kharkov (UA)

(72) Inventor: Sergii Kramarenko, Kharkov (UA)

( * ) Notice: Subject to any disclaimer, the term of this patent is extended or adjusted under 35 U.S.C. 154(b) by 0 days.

(21) Appl. No.: 15/102,614

(22) PCT Filed: Jul. 30, 2015

(86) PCT No.: PCT/IB2015/055760
§ 371 (c)(1),
(2) Date: Jun. 8, 2016

(87) PCT Pub. No.: WO2016/124991
PCT Pub. Date: Aug. 11, 2016

(65) Prior Publication Data
US 2017/0322009 A1    Nov. 9, 2017

(30) Foreign Application Priority Data

Feb. 3, 2015 (UA) .................................. 201500850

(51) Int. Cl.
*G01B 3/20* (2006.01)
*G01B 5/02* (2006.01)
*G01B 3/00* (2006.01)

(52) U.S. Cl.
CPC ............... *G01B 3/20* (2013.01); *G01B 3/008* (2013.01); *G01B 3/205* (2013.01); *G01B 5/02* (2013.01)

(58) Field of Classification Search
None
See application file for complete search history.

(56) References Cited

U.S. PATENT DOCUMENTS

| 1,516,631 A | * | 11/1924 | D'Erville | G01B 3/20 33/810 |
| 2,920,395 A | * | 1/1960 | Germann | G01B 3/20 33/534 |
| 2,924,017 A | * | 2/1960 | Sorenson | G01B 3/20 33/796 |

(Continued)

FOREIGN PATENT DOCUMENTS

| JP | 2010038730 A | 2/2010 |
| SU | 13489 A1 | 3/1930 |
| SU | 1229555 A1 | 5/1986 |

OTHER PUBLICATIONS

GTSI SI VNIIMS. Shtangentsirkuli tsifrovye sery 500, 550, 551, 552, 573. Oct. 19, 2005, p. 1 par.1, p. 2, par.1.

*Primary Examiner* — Sunit Pandya
(74) *Attorney, Agent, or Firm* — Defillo & Associates, Inc.; Evelyn A Defillo

(57) ABSTRACT

A tared caliper having a measuring bar with a fixed jaw, a moving frame with a measuring indicator and with a moving jaw, an accurate feed mechanism, a measurement effort device with a calibrated flexible member. The calibrated flexible member in form the non-fixed replaced cylindrical compression spring with effort from 0.5 . . . 3 N to 25 . . . 60 N. The non-fixed replaced cylindrical compression spring coaxial into the rod inside the body by the measurement effort device. The body is connected to a moving frame. The force indicator includes from the marking window on the body and from the force scale on the rod. The rod is connected to an accurate feed mechanism. The rod is pressed to the flexible member.

1 Claim, 2 Drawing Sheets

(56) References Cited

U.S. PATENT DOCUMENTS

| | | | | |
|---|---|---|---|---|
| 3,826,008 A | * | 7/1974 | Nishina | G01B 3/004 33/501.06 |
| 4,151,653 A | * | 5/1979 | Nishina | G01B 3/20 33/501.06 |
| 4,731,931 A | * | 3/1988 | Goodman | G01B 3/20 33/520 |
| 6,223,136 B1 | * | 4/2001 | Geiger | G01B 3/205 33/1 L |
| 7,533,474 B2 | * | 5/2009 | Saito | F16D 7/048 33/783 |
| 7,735,237 B1 | * | 6/2010 | Moon | G01B 3/20 33/783 |
| 2008/0047158 A1 | * | 2/2008 | Saito | F16D 7/048 33/811 |
| 2015/0247717 A1 | * | 9/2015 | Emtman | G01B 3/205 74/89 |
| 2015/0276366 A1 | * | 10/2015 | Emtman | G01B 3/205 33/701 |

* cited by examiner

TARED CALIPER

BACKGROUND OF THE INVENTION

Field of the Invention

The invention relates to the control measuring tools for measurement of the linear dimensions. The subject tared caliper can be used in the machine-building industry and aircraft manufacturing, everywhere, where the accurate measurement with the permanent effort is required.

Description of the Related Art

For the purpose of accurate measurement of details with the specified effort (according to international and national standards) the following means of measurement equipment are used today:
  micrometers;
  indicators.

According to the current Ukrainian State Standards DSTU 6507: 2009 "Micrometers. Specifications" the existing micrometers provide the measurement accuracy of 4-6 .mu·m within the measurement range from 0-25 to 275-300 mm, with the effort equal to 5-10 N.

According to the current Ukrainian State Standards DSTU 577: 2009 "Clock-type dial indicators graduated in unit divisions of 0.01 mm. Specifications" the existing indicators provide the measurement accuracy of 15-50 .mu·m with the measurement range from 0-10 to 0-100 mm, with the effort equal to 1.5 N (for the range of 0-10 mm) or 3 N (for the range of 0-100 mm).

According to the current Ukrainian State Standards DSTU 166: 2009 "Vernier calipers. Specifications" the existing vernier calipers have no provisions of any devices for ensuring the calibrated effort; however the indicated standard specifies the following efforts during the measurements:

a) according to cl. 2.9. of the standard the minimum effort is established (without specifying the numerical values) to prevent the free movement of the frame with respect to the caliper bar by gravity, that in practice corresponds to the total weight of the frame with measurement jaw and attached fine feed mechanism, and as per our experience the same is equal to the following:
  from 0.3 to 0.5 N for the calipers with the range up to 150 mm;
  from 0.8 to 1.2 N for the calipers with the range up to 250 mm;
  from 1.5 to 2 N for the calipers with the range up to 400 mm;
  from 2.5 to 10 N for the calipers with the range up to 500 mm;

b) according to cl. 2.10. of the standard the following maximum efforts are established for movement of frame with respect to the vernier caliper bar (requirements of the state standard):
  not exceeding 10 or 15 N for the vernier calipers having the ranges of 0-125 and 0-150;
  not exceeding 15 N for the calipers with the top range of 250 mm;
  not exceeding 25 N for the calipers with the top range of 400 mm;
  not exceeding 30 N for the calipers with the top range of 2000 mm;

Therefore, the existing vernier calipers according to standard Ukrainian State Standards DSTU 166:2009 have the internal contradiction related to the regulatory establishment of efforts during the measurements performed by the vernier calipers and complete absence of some technical means to ensure these regulated efforts.

Compared to micrometers and indicators, which are regulated by the standards and actually ensure the regulated efforts of the measurements (due to the devices of calibrated effort), the vernier calipers are regulated, but have no devices to ensure the regulated efforts of the measurements.

The authenticity of the vernier caliper measurements depends to the considerable extent on the skills of an operator to ensure the required measurement effort, for which reason the human factor effect for the vernier calipers is considerably higher than for micrometers and indicators.

The maximum efforts during the vernier caliper measurements as established by cl. 2.10. of Ukrainian State Standards DSTU 166-2009 are not optimal under the conditions of real life application:

when measuring the elastic details by the vernier caliper the detail material deformation is possible, which require considerably less measurement efforts compared to the efforts according to cl. 2.10 of Ukrainian State Standards DSTU 166: 2009;

when measuring the large-size details the vernier calipers having the large measuring jaws are used, at the same time the considerably higher efforts of vernier caliper measurements are required to ensure the full contact of the measuring jaws with detail compared to the values according to cl. 2.10 of Ukrainian State Standards DSTU 166: 2009;

in cl. 2.10 of the current Ukrainian State Standards DSTU 166-2009 quite doubtful correlation between the vernier caliper measurement efforts and working bar length is suggested, whereas in practice the correlation of measurement efforts takes place with the area or length of the measuring jaws (taking into account the friction due to the total weight of the measuring frame and moving measuring jaw).

Therefore. the analysis of the level of existing means of linear measurements evidences the following:

existing vernier calipers, micrometers, indicators according to the current Ukrainian State Standards DSTU 166: 2009 shall ensure the established measurement efforts to fulfill the required conditions of the measurements;

the vernier calipers as against the micrometers and indicators do not comprise any devices for ensuring the calibrated efforts during the measurements; the same reduce the accuracy and decrease the errors of measurements due to the subjective component;

the measurement efforts as regulated by Ukrainian State Standards DSTU 166: 2009 for the existing vernier calipers in practice do not correspond to the optimal calibrated efforts for receiving the authentic results, first of all, for the elastic and large-size details.

SUMMARY OF THE INVENTION

The task of development the invention tared caliper was the increase of measurement accuracy by vernier caliper through reduction of the human factor effect and reduction of error by 30 to 60% when measuring elastic and large-size details due to ensuring the optimal vernier caliper measurement effort, The vernier caliper was selected as a prior art for measurement of details made of elastic materials made by MITUTOYO having the range of 180 mm /1/, which had the device with additional movable measuring jaw arranged on the fixed jaw of the measuring bar of the vernier caliper, which device ensured the calibrated effort of 0.49 to 0.98 N.

The disadvantages of the world-known vernier caliper made by MITUTOYO having the calibrated effort /1/, which has been selected as the closest prior art of invention of the vernier caliper are the following:

arrangement of the device ensuring the calibrated effort with additional movable measuring jaw on the fixed jaw of the measuring bar of the vernier caliper increased by times the parallelism of the measuring jaws and deteriorated the rated error of the similar invention of the vernier caliper from 0.03 to 0.05 mm.

non-compliance of the calibrated efforts 0.49-0.98 N of the prior art /1/ to the requirements of cl. 2.9. of Ukrainian State Standards DSTU 166: 2009 /2/ in terms of avoidance of movement by gravity of the measuring frame of the vernier caliper, as the weight of frame with the feed mechanism may not exceed 0.98 N;

impossibility of using the prior art /1/ with the strictly set calibrated measurement effort of 0.49-0.98 N for the vast majority of the measurements of the detail dimensions exceeding 200 mm as well as for measurement of elastic or large-size details making use of the measuring jaws exceeding 40 mm.

The invention "Vernier Caliper" lays is about the following:

the tared caliper has the device of calibrated effort with the flexible member to ensure the optimal measurement effort, which member is arranged between the accurate feed mechanism and measuring frame of the tared caliper; the same does not distort the parallelism of the measuring jaws and ensure the minimum error of the measurements;

the calibrated effort device of the tared caliper ensures the fine adjustment and indication of the optimal measurement effort within the entire range of the loads of a single calibrated member by means of pressing of the calibrated measurement effort device by the accurate feed mechanism of the tared caliper;

the calibrated measurement effort device is capable of setting (almost without limitations) the required measurement effort by the tared caliper due to the replacement of the respective calibrated flexible members, which are optimal for the measurement conditions.

DETAILED DESCRIPTION

Figure 1:
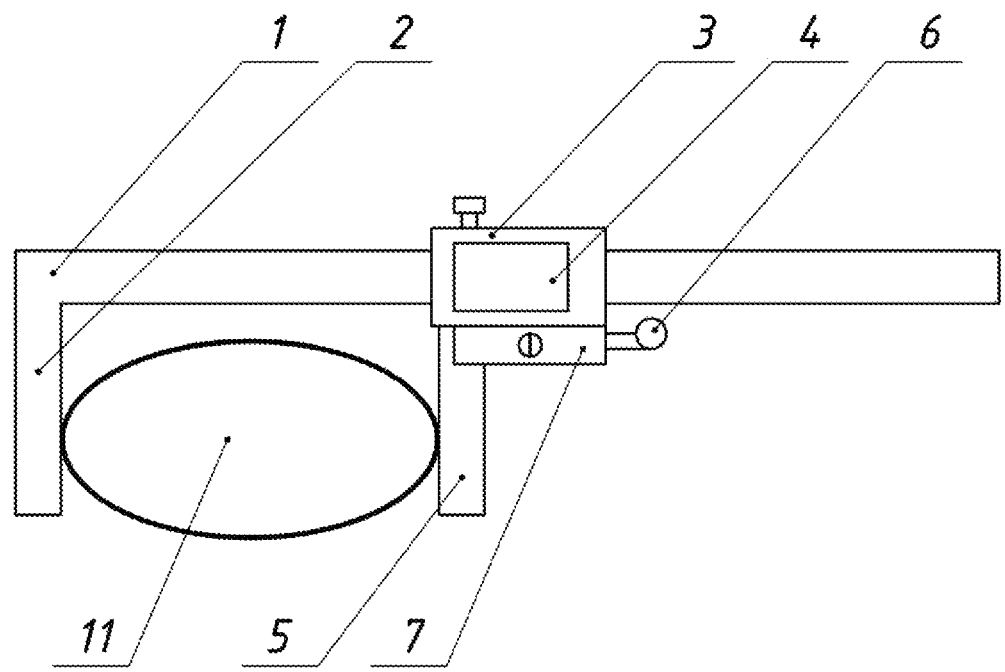
FIG. 1 is a schematic representation of the structure of the tared caliper claimed.

The subject invention tared caliper consists of a measuring bar 1 with a fixed jaw 2, a moving frame 3 along with a measuring indicator 4 and with a moving jaw 5, attached to an accurate feed mechanism 6; and at the same time it is different from the well-known prior art of the vernier caliper in the fact that a measurement calibrated effort device 7, which ensures an optimal effort during measurements with a vernier caliper, is arranged between the moving frame 3 and accurate feed mechanism 6 (FIG. 1).

Figure 2:
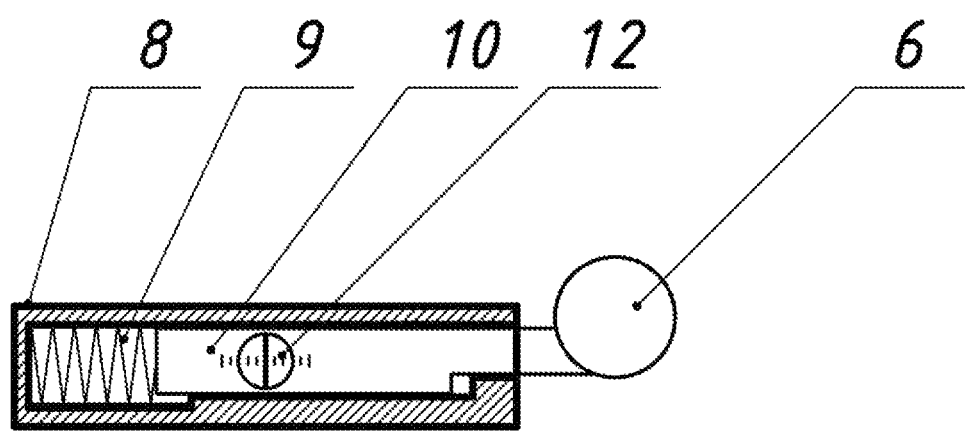
FIG. 2 is a schematic representation of the structure of the measurement calibrated effort device of the tared caliper claimed.

The measurement calibrated effort device 7 of the tared caliper is made in the form of body 8 (which is connected to the moving frame 3) with a calibrated flexible member 9 (in the form of metallic or non-metallic elastic spring) and a rod 10 (which is pressed to the flexible member 9 and connected to the accurate feed mechanism 6), at the same time the rod 10 has the scale for indication of the measurement effort, and a force indicator 12 is located in the body 8 for the purpose of control of the measurement effort indication scale when the rod 10 is moving (FIG. 2).

A detail 11 being measured is located between the measuring jaws of the vernier caliper (fixed 2 and moving 5), which detail is pressed by the said measuring jaws 2 and 5 by means of the calibrated effort device 7, when the accurate feed mechanism 6 is moving (FIG. 1).

Taking into account the physical and mechanical specific features and dimensions of the details being measured, the tared caliper provides the possibility of selection of almost any optimal measurement calibrated efforts in accordance with the conditions of use of the tared caliper.

Based on the many-years of the practical experience in production of vernier calipers we recommend to use the following optimal nominal values of efforts P of the calibrated flexible members of the tared caliper:

the effort of 0.5-3 N for the measurement of elastic details making use of measuring jaws having the length up to 40 mm;

the effort of 2-12 N for the measurements of hard details making use of measuring jaws having the length of 40-60 mm or details made of elastic materials by means of measuring jaws having the length of 40-120 mm;

the effort of 10-30 N for the measurements of hard details making use of measuring jaws having the length of 60-160 mm or measurement of elastic details by means of measuring jaws having the length of 100-250 mm;

the effort of 25-60 N for the measurement of hard details with the length of measuring jaws of 250-500 mm.

The measuring indicator 4 of the tared caliper (FIG. 1) can be made as one of three existing options:

with analogue indication with the use of line scales and vernier scales (similarly to the vernier calipers of ShC ( ) type)

with analogue indication with the use of dial (indicator) scale (similarly to the vernier calipers of ShCK ( ) type);

with digital indication (similarly to the vernier calipers of ShCC ( ) type).

The measurements with the use of the subject tared caliper are performed in the following order:

the corresponding (optimal to the vernier caliper measurement conditions) replaceable flexible member 9 with the optimal calibrated effort P, which takes into account the above mentioned recommendations, is installed in the calibrated effort device 7 (FIG. 1, FIG. 2);

detail 11 is pressed to the fixed measuring jaw 2 (FIG. 1);

the moving measuring jaw 5 by means of the accurate feed mechanism 6 (through the calibrated effort device 7, connected to the moving frame 3 and said measuring jaw 5) is gradually approached to the detail 11 (measuring indicator 4 of the vernier caliper confirms the considerable reduction of gap between measuring jaws 2 and 5) until detail 11 is grasped to the minimum extent between the measuring jaws 2 and 5; in this case the force indicator 12 of the calibrated effort device 7 indicates the absence of load on the detail 11 in the initial position of the vernier caliper (FIG. 1, FIG. 2);

in case of further grasping of the detail 11 being measured between the measuring jaws 2 and 5 (by means of the accurate feed mechanism 6 through the calibrated effort device 7) the approaching of the measuring jaws 2 and 5 is slowing down (only for several hundredth of millimeters); in this case the measurement effort of detail 11 is increasing apidly between the measuring jaws 2 and 5, achieving gradually the optimal calibrated effort P (FIG. 1);

the moment of achieving the optimal effort of vernier caliper measurement is controlled by means of the force indicator 12 of the calibrated measurement effort device 7, the same ensures the exact value of the actual size of the detail 11 (FIG. 1, FIG. 2).

In case of performing the repeated (duplicate) measurement the following shall be performed:

the accurate feed mechanism 6 is withdrawn to the position of initial contact of the measuring jaws 2 and 5 with the detail 11 (with zero measurement effort) (FIG. 1);

the loads of flexible member 9 are repeated by means of the accurate feed mechanism 6 with making of transfers (FIG. 2);

in case of measuring the detail 11, which is different from the previous one (in terms of size or its physical and chemical properties), the measuring jaws 2 and 5 are opened beyond the dimensions of the detail 11, and after that the above mentioned transfers are repeated (FIG. 1).

According to the claims of invention tared caliper the applicant prepared two operative embodiments of the vernier caliper of two standard sizes (ShCC ( )-150 and ShCC ( )-1000) in accordance with the subject invention tared caliper and of the conventional design according to Ukrainian State Standards DSTU 166: 2009 /2/, the comparative metrological control in the certified calibrating laboratory of Private Scientific and Research Company "MIKROTECH", refer to the table.

TABLE

| Range of measurements, mm/Length of measuring jaws, mm | | Measurement effort, N | | Measurement error, mm Non-classified/classified | | | |
|---|---|---|---|---|---|---|---|
| | | | | Invention | | Prior art /2/ | |
| Invention | Prior art /2/ | Invention | Prior art /2/ | Non-classified | Classified | Non-classified | Classified |
| (0-150)/40 | (0-150)/40 | Rated 8.0 | Not rated | 0.20 | 0.10 | 0.050 | 0.025 |
| (0-1000)/150 | (0-1000)/150 | Rated 20.0 | Not rated | 0.70 | 0.50 | 0.100 | 0.065 |

The comparative analysis of two standard sizes of the calibrated caliper with the existing prior arts /1/, as provided in the table, has fully proved the advantages of the proposed invention in terms of the measurement accuracy improvement and reduction of the measurement errors for the measurement, which are different in their ranges and length of the measurement jaws.

As a result of the metrological control of the subject invention tared caliper and existing prior arts /1/ the possibility of the practical implementation, absolute technical and economic advantages of the invention tared caliper are confirmed.

The subject invention tared caliper implements the advantages in the best way and eliminates the main disadvantage with respect to the entire group of the beam-type measuring tools.

The invention claimed is:

1. A tared caliper to measure an object comprising:
a measuring bar with a fixed jaw;
a moving frame with a moving jaw, the moving frame slides through the measuring bar;
a measuring indicator located on the moving frame;
an accurate feed mechanism attached to the moving frame;
a measurement effort device located between the moving frame and the accurate feed mechanism;
wherein the measurement effort device includes:
a body connected to the moving frame;
a flexible member located inside the body;
a rod inside the body, the rod having a first end pressed to the flexible member, a second end connected to the accurate feed mechanism, a scale, and a force indicator, the rod presses the flexible member;
the flexible member is a replaced non-fixed compression spring with an effort from 0.5 . . . 3 N to 25 . . . 60 N;
the force indicator includes a marked window and a force scale;
wherein the flexible member moves sequentially and axially with the scale of the rod;
wherein the accurate feed mechanism pushes sequentially and axially the flexible member through the force indicator;
wherein the object is pressed by the fixed jaw and the moving jaw by the measurement effort device when the accurate feed mechanism moves.

* * * * *